United States Patent
Minami et al.

(10) Patent No.: US 8,864,174 B2
(45) Date of Patent: Oct. 21, 2014

(54) VEHICLES HAVING REAR SEAT BELT ASSEMBLIES

(71) Applicants: Hidemi Minami, Dublin, OH (US); Takeshi Kobayashi, Utsunomiya (JP); Jeremy T. McGuire, Powell, OH (US); Drey Dircks, Westerville, OH (US); Darin D. King, Raymond, OH (US); Tsuyoshi Kumasaka, Dublin, OH (US); Noriyuki Muto, Columbus, OH (US); Casey Heit, Sandy, UT (US); Jacob O. Borth, Dublin, OH (US); Christopher Michael Krajewski, Mukwonago, WI (US); Christopher Joe Kranz, Troy, MI (US)

(72) Inventors: Hidemi Minami, Dublin, OH (US); Takeshi Kobayashi, Utsunomiya (JP); Jeremy T. McGuire, Powell, OH (US); Drey Dircks, Westerville, OH (US); Darin D. King, Raymond, OH (US); Tsuyoshi Kumasaka, Dublin, OH (US); Noriyuki Muto, Columbus, OH (US); Casey Heit, Sandy, UT (US); Jacob O. Borth, Dublin, OH (US); Christopher Michael Krajewski, Mukwonago, WI (US); Christopher Joe Kranz, Troy, MI (US)

(73) Assignees: Honda Motor Co., Ltd., Tokyo (JP); TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/173,479

(22) Filed: Feb. 5, 2014

(65) Prior Publication Data

US 2014/0217715 A1 Aug. 7, 2014

Related U.S. Application Data

(60) Provisional application No. 61/761,256, filed on Feb. 6, 2013.

(51) Int. Cl.
*B60R 22/34* (2006.01)

(52) U.S. Cl.
USPC .......................................... 280/807; 280/756

(58) Field of Classification Search
USPC .................. 280/756, 801.1, 807, 808, 730.2; 297/232, 248
See application file for complete search history.

(56) References Cited

U.S. PATENT DOCUMENTS

| | | | |
|---|---|---|---|
| 3,545,788 A | 12/1970 | Brawner et al. | |
| 7,364,200 B2 | 4/2008 | Downey | |
| 7,762,621 B2 | 7/2010 | Duller | |
| 8,002,331 B2 | 8/2011 | Bowers | |
| 8,087,694 B2 | 1/2012 | Johnson et al. | |
| 8,251,400 B2 | 8/2012 | Davis et al. | |
| 8,328,235 B2 | 12/2012 | Schneider et al. | |
| 8,353,534 B2 * | 1/2013 | Arnold et al. | 280/801.1 |
| 2010/0314191 A1 | 12/2010 | Deckard et al. | |
| 2011/0133438 A1 * | 6/2011 | Haines et al. | 280/769 |
| 2012/0217078 A1 * | 8/2012 | Kinsman et al. | 180/69.4 |
| 2014/0225359 A1 * | 8/2014 | Shinbori et al. | 280/808 |

\* cited by examiner

*Primary Examiner* — Faye M. Fleming
(74) *Attorney, Agent, or Firm* — Ulmer & Berne LLP (57) ABSTRACT

A vehicle includes a roll cage, at least one rear seat, and at least one rear seat belt assembly. Each rear seat is positioned within a rear protected area at least partially defined by the roll cage. Each rear seat belt assembly is associated with a respective one of the rear seats, and includes a retractor assembly attached to the roll cage.

20 Claims, 8 Drawing Sheets

VEHICLES HAVING REAR SEAT BELT ASSEMBLIES

REFERENCE TO RELATED APPLICATION

The present application claims priority of U.S. provisional application Ser. No. 61/761,256, filed Feb. 6, 2013, and hereby incorporates the same application herein by reference in its entirety.

TECHNICAL FIELD

Disclosed herein are vehicles having rear seat belt assemblies.

BACKGROUND

Some conventional vehicles include a roll cage which assists in protecting properly seated and secured operators during a rollover situation or a situation involving a significant lateral incline of the vehicle.

SUMMARY

In accordance with one embodiment, a vehicle comprises a frame, a body, a roll cage, at least one rear seat, and at least one rear seat belt assembly. The body is supported by the frame. The roll cage is supported by at least one of the frame and the body. The roll cage at least partially defines a rear protected area. Each of the at least one rear seat is positioned within the rear protected area. Each of the at least one rear seat belt assembly is associated with a respective one of the at least one rear seat. The roll cage comprises a rear structure. The rear structure comprises an upright portion supported by, and extending at least generally upwardly from, at least one of the frame and the body. The rear structure further comprises an upper portion extending at least generally forwardly from the upright portion. Each of the at least one rear seat belt assembly comprises a retractor assembly, a flexible web member, an anchor, a plurality of tongues, and a plurality of buckle assemblies. The retractor assembly is attached to the upper portion of the rear structure of the roll cage. The flexible web member extends from the retractor assembly. The anchor is connected to the upright portion of the rear structure of the roll cage. The flexible web member is connected to the anchor and each of the tongues. Each of the buckle assemblies is adjacent one of the at least one rear seat. For each of the at least one rear seat belt assembly, each of the tongues is configured for releasable engagement with a respective one of the buckle assemblies, to at least partially restrain a person seated on a respective one of the at least one rear seat, when the rear seat belt assembly is in a use configuration.

In accordance with another embodiment, a vehicle comprises a frame, a body, a roll cage, a utility bed, and at least one rear seat belt assembly. The body is supported by the frame. The roll cage is supported by at least one of the frame and the body. The roll cage comprises a rear structure and at least partially defines a rear protected area. The utility bed is supported by at least one of the frame and the body, and is convertible to selectively provide at least one rear seat. Each of the at least one rear seat comprises an inward side and an outward side. Each of the at least one rear seat is positioned within the rear protected area. Each of the at least one rear seat belt assembly is associated with a respective one of the at least one rear seat. Each of the at least one rear seat belt assembly comprises a retractor assembly, a flexible web member, a proximal tongue, a distal tongue, a first buckle assembly, and a second buckle assembly. The retractor assembly is attached to the rear structure of the roll cage. The flexible web member extends from the retractor assembly. The flexible web member is connected to each of the proximal tongue and the distal tongue. For each of the at least one rear seat belt assembly, the first buckle assembly is configured for releasable engagement with the proximal tongue and is pivotally coupled with at least one of the frame and the body at a position proximate one of the inward side and the outward side of one of the at least one rear seat, with the second buckle assembly being pivotally coupled with at least one of the frame and the body at a position proximate the other one of the inward side and the outward side of the one of the at least one rear seat.

BRIEF DESCRIPTION OF THE DRAWINGS

Various embodiments will become better understood with regard to the following description, appended claims and accompanying drawings wherein:

DETAILED DESCRIPTION

Figure 1:
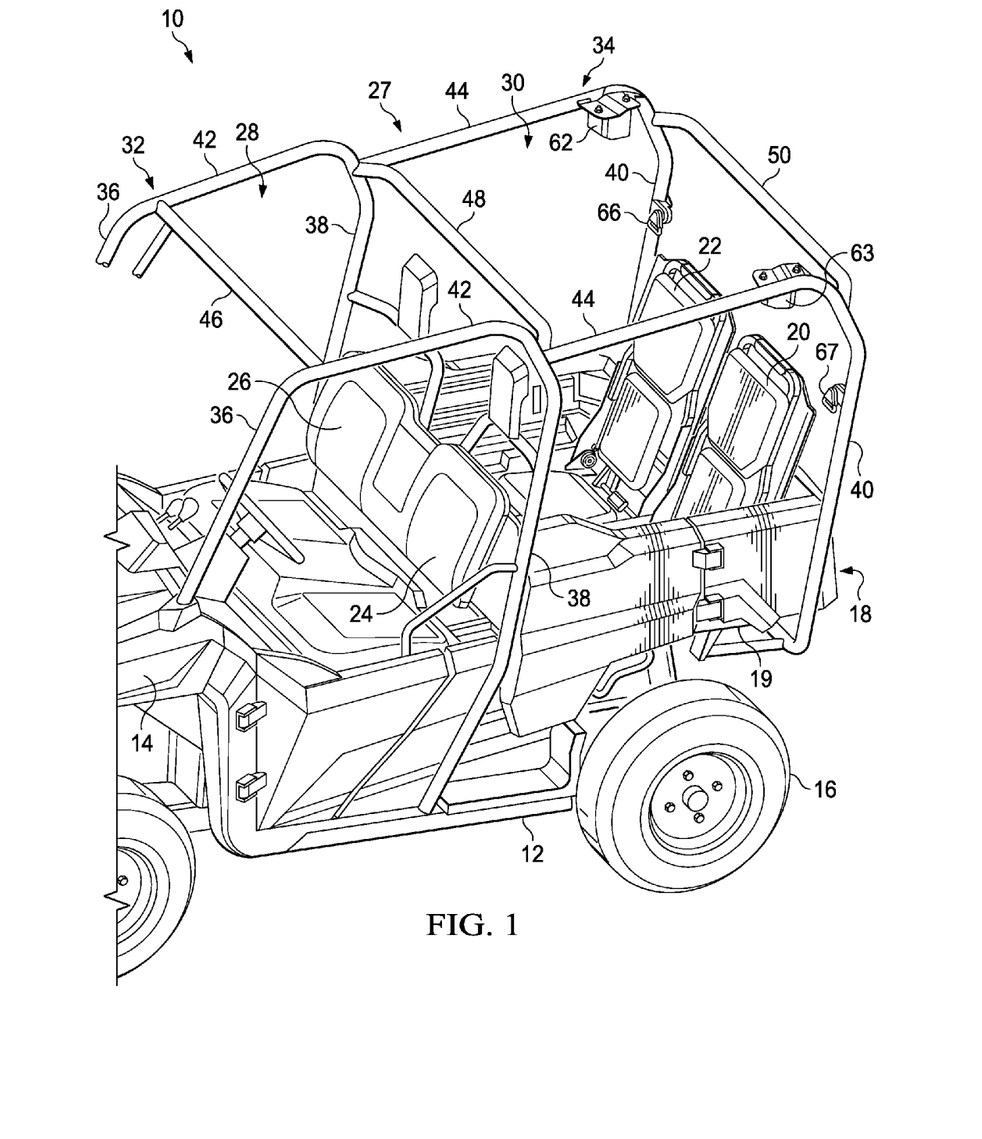
FIG. 1 is top perspective view generally depicting a portion of a multi-use vehicle ("MUV") having rear seat belt assemblies in accordance with one embodiment, with flexible web members thereof shown to be entirely retracted.

Certain embodiments are hereinafter described in detail in connection with the views and examples of FIGS. 1-8. FIG. 1 illustrates a vehicle 10 that can include a frame, indicated generally at 12, and a body 14 supported by frame 12. Vehicle 10 can further include a pair of front wheels and a pair of rear wheels (e.g., 16), which can be suspended from frame 12 and can be rotatable relative to frame 12. Vehicle 10 can also include a source of motive power (not shown), which can be an internal combustion engine and/or one or more electric motors, and a drivetrain (not shown) for transferring torque from the source of motive power to the wheels (e.g., 16).

Vehicle 10 is shown to be a utility-type vehicle that can include a utility bed 18. The utility bed 18 can include a bed frame (shown generally as 19 in FIG. 1) that can be pivotally coupled with, or otherwise supported by, at least one of the frame 12 and the body 14. The utility bed 18 can be fixed with respect to the body 14, or can be selectively pivotable as a dump-type bed, between a hauling position (FIG. 1) and a dumping position (not shown). The utility bed 18 can be configured to support cargo and/or passengers for transportation by the vehicle 10. In one embodiment, the utility bed 18 can include a left rear seat 20 and a right rear seat 22. In one embodiment, the utility bed 18 can be convertible, to selectively provide the left rear seat 20 and the right rear seat 22 to facilitate seating of persons (as shown in FIG. 1), and to alternatively facilitate folding downward of the left rear seat 20 and/or the right rear seat 22 into the utility bed 18 to define a cargo support floor within the utility bed 18. In an alternative embodiment, rear seats can be fixed in position relative to a dump-type or non-dump type utility bed disposed rearward of the rear seats. In still other embodiments, a vehicle having rear seats might not include a utility bed.

Vehicle 10 can further include a left front seat 24 and a right front seat 26 that can be supported by the frame 12 and/or body 14. Each of the left rear seat 20, the right rear seat 22, the left front seat 24, and the left rear seat 26 can be configured to support a respective person such as an operator (e.g., a driver or a passenger) of the vehicle.

Vehicle 10 can include a roll cage 27 which can be attached to, and supported by, the frame 12 and/or body 14 of vehicle 10. The roll cage 27 can include a forward structure 32 that at least partially defines a front protected area, indicated generally at 28, and a rear structure 34 that at least partially defines a rear protected area, indicated generally at 30. The left front seat 24 and the right front seat 26 can be positioned within the front protected area 28, such that operators can be located within the front protected area 28 when seated upon the left front seat 24 and the right front seat 26 during operation of vehicle 10. The left rear seat 20 and the right rear seat 22 can be positioned within the rear protected area 30, such that operators can be located within the rear protected area 30 when seated upon the left rear seat 20 and the right rear seat 22 during operation of vehicle 10.

The roll cage 27 can include one or more tubular members that are attached to the frame 12 and/or the body 14 of vehicle 10, and that cooperate to form one or both of the forward structure 32 and the rear structure 34. For example, the forward structure 32 can include upright portions 36 and 38, transverse portions 46 and 48, and upper portions 42. As another example, the rear structure 34 can also include upright portions 38 and transverse portion 48, along with upright portions 40, and transverse portion 50, and upper portions 44. The upper portions 44 are shown to extend at least generally forwardly from the respective upright portions 40. The upright portions 38 are shown to be generally forward of the left rear seat 20 and the right rear seat 22, and the upright portions 40 are shown to be generally rearward of the left rear seat 20 and the right rear seat 22. The upper portions 44 can be positioned within a common horizontal plane disposed vertically above the heads of passengers seated in the left rear seat 20 and the right rear seat 22. Each of the upright portions 36, 38, and 40 can be supported by, and extend at least generally upwardly from, at least one of the frame 12 and the body 14, as shown in FIG. 1.

The tubular members of the roll cage 27 can have any of a variety of suitable configurations. In one embodiment, the tubular members can be generally cylindrical in shape and can have a hollow interior. In other embodiments, roll cages can be provided that include generally cylindrical, solid tubular members. In still other embodiments, roll cages can be provided with tubular members having a variety of alternative shapes, e.g., tubular members having generally square or generally rectangular cross-sectional shapes. Tubular members of a roll cage can be attached together with welding, mechanical joins, or otherwise.

Figure 4:
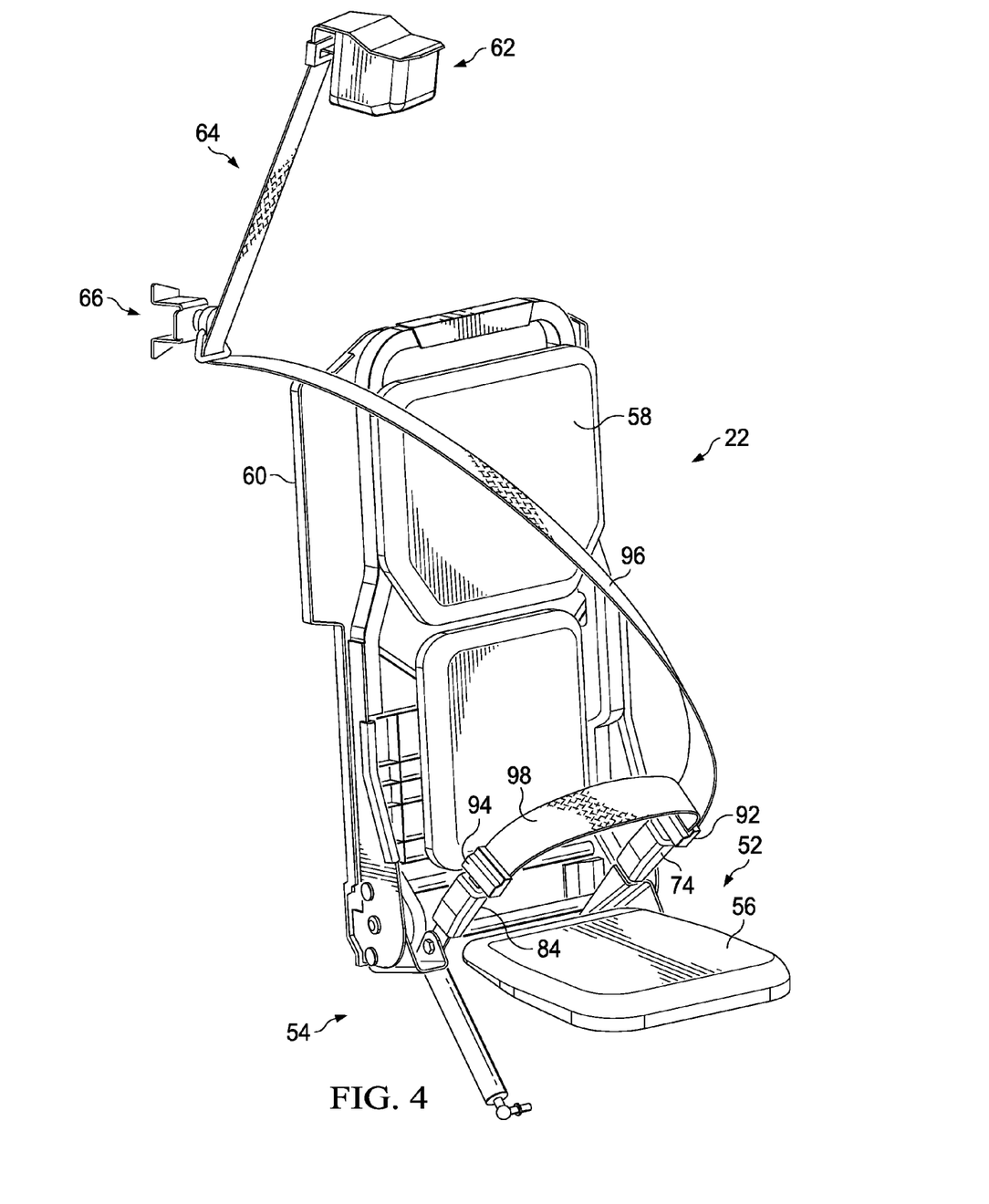
FIG. 4 is a perspective view depicting one of the rear seat belt assemblies in association with a right rear seat of the vehicle of FIG. 1.

Referring to FIG. 4, the right rear seat 22 can include a seat portion 56 and a backrest portion 58 which together cooperate to support a person seated on the right rear seat 22. The backrest portion 58 can include a rear surface 60 that can provide a cargo support floor of the utility bed 18 when the right rear seat 22 is folded downward into the utility bed 18. The right rear seat 22 can include an inward side 52 and an outward side 54.

Figure 2:
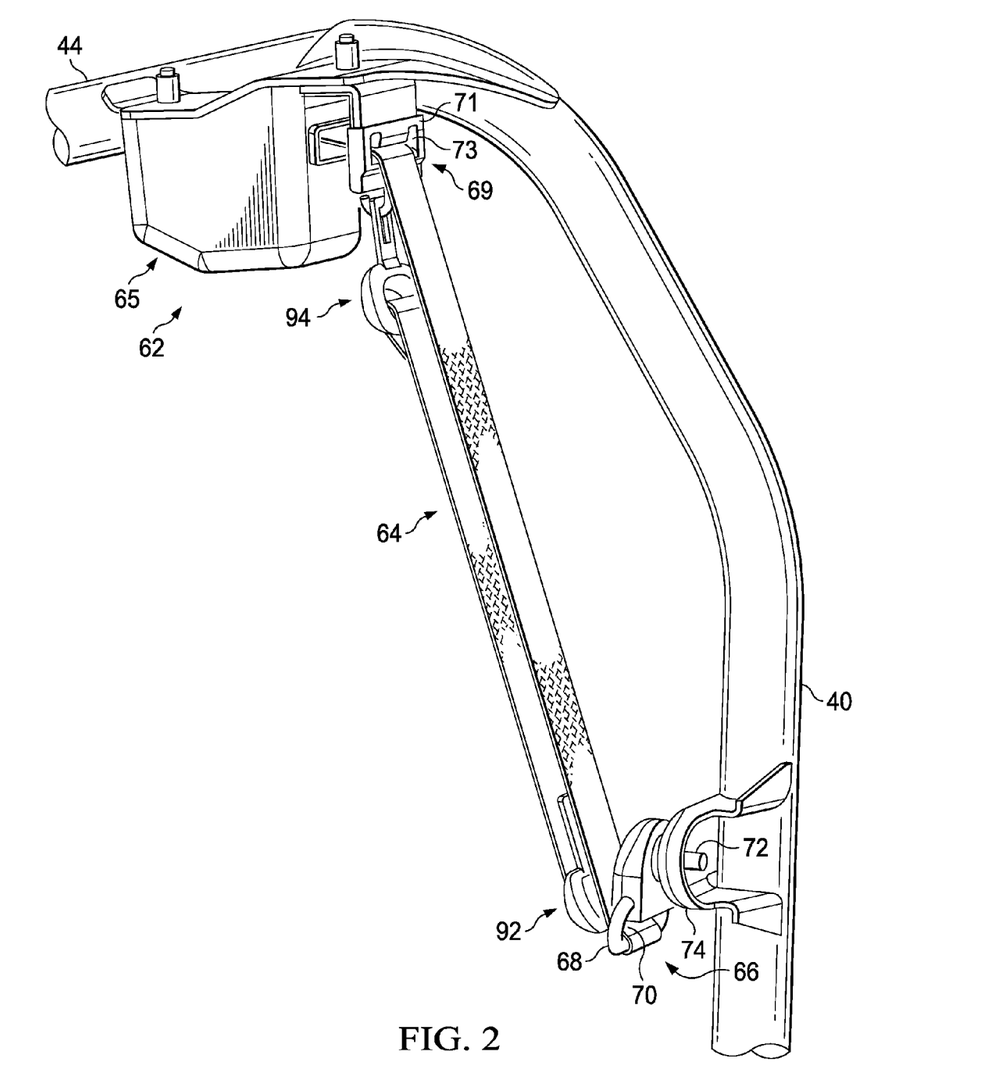
FIG. 2 is an enlarged side perspective view depicting a portion of the vehicle of FIG. 1, wherein a flexible web member is shown to be partially withdrawn.
Figure 6:
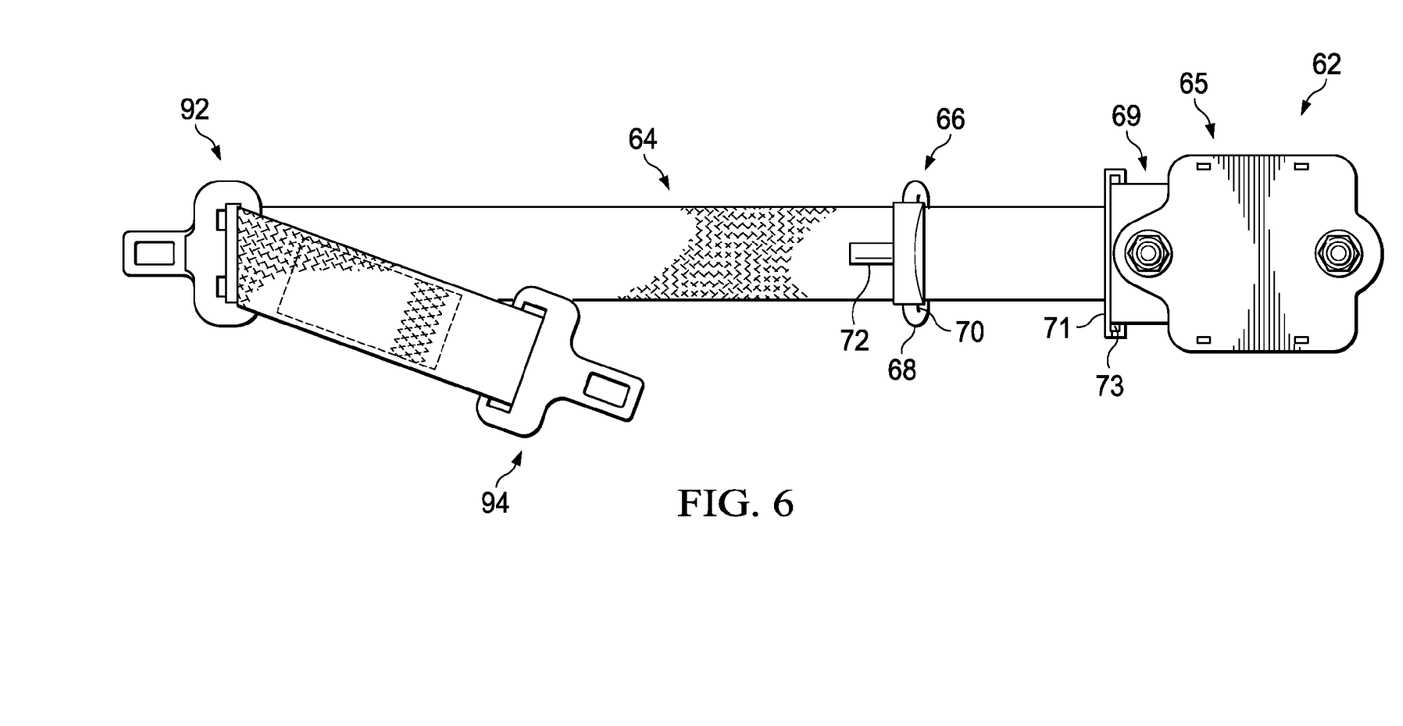
FIG. 6 is a top plan view depicting certain of the components of FIG. 2 removed from the remainder of the vehicle.
Figure 7:
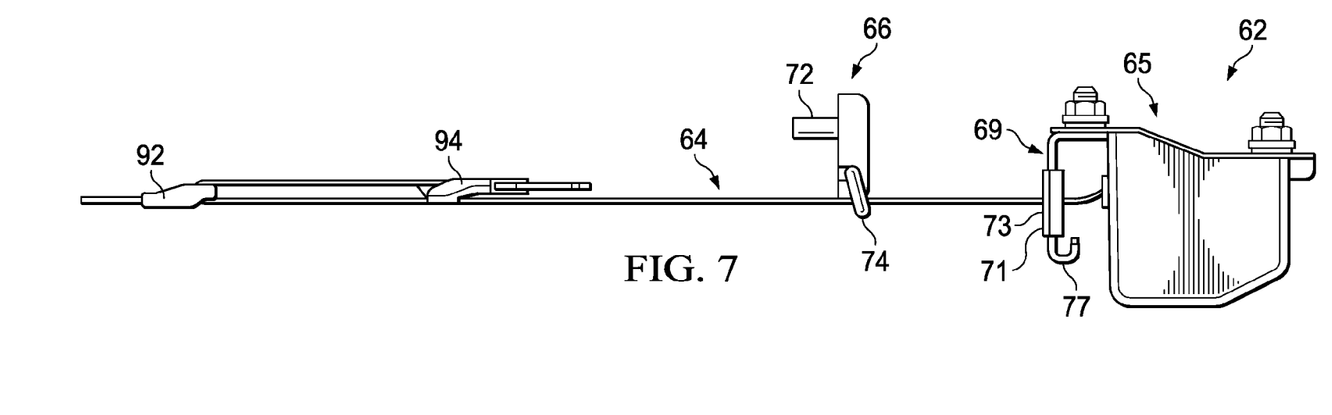
FIG. 7 is a side elevational view depicting the components of FIG. 6.
Figure 8:
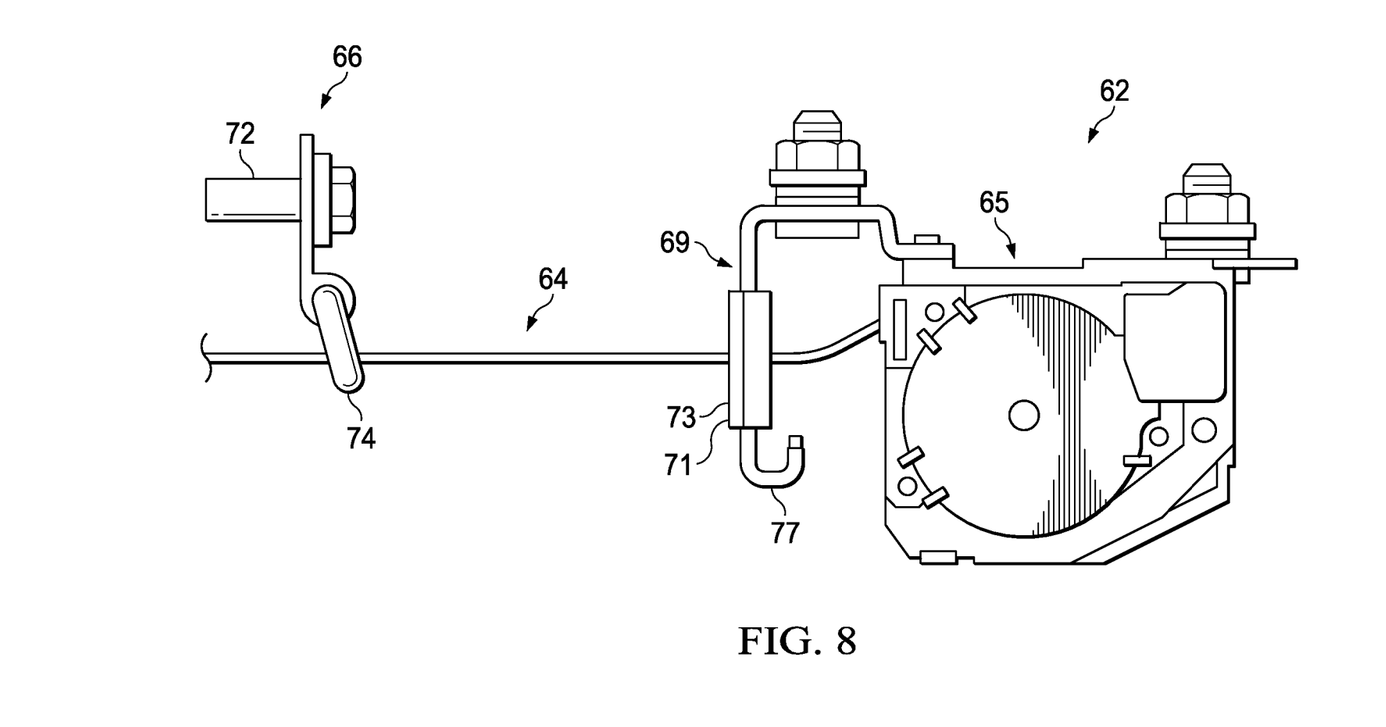
FIG. 8 is an enlarged side elevational view depicting a portion of the arrangement of FIG. 7, partially in fragment.

The vehicle 10 can also include a respective rear seat belt assembly associated with each rear seat of the vehicle 10. For example, with respect to the right rear seat 22, an associated rear seat belt assembly can include a retractor assembly 62. The retractor assembly 62 can include a retractor 65 and a webbing guide 69, as shown in FIGS. 6-8. The retractor assembly 62, and more particularly the retractor 65, can be attached to the upper portion 44 of the rear structure 34 of the roll cage 27, as shown in FIGS. 1-2. The retractor 65 can be configured to operably and selectively dispense and retract a flexible web member 64. The webbing guide 69 can be positioned proximate the retractor 65 and connected to at least one of the retractor 65 and the roll cage 27. The webbing guide 69 can include a guide member 71 that defines a guide aperture 73. In the configuration of FIG. 1, it can be seen that the retractor assembly 62 can be overhead of a person seated in the left rear seat 20. By attaching the retractor assembly 62 to the upper portion 44 of the rear structure 34 of the roll cage 27, it will be appreciated that the retractor assembly 62 is less likely to interfere with dumping of the utility bed 18 and/or less likely to interact with cargo being loaded or unloaded into the utility bed 18 (e.g., dirt being shoveled into the utility bed 18), than would a retractor assembly attached to an upright portion (e.g., 40) of a roll cage.

Figure 5:
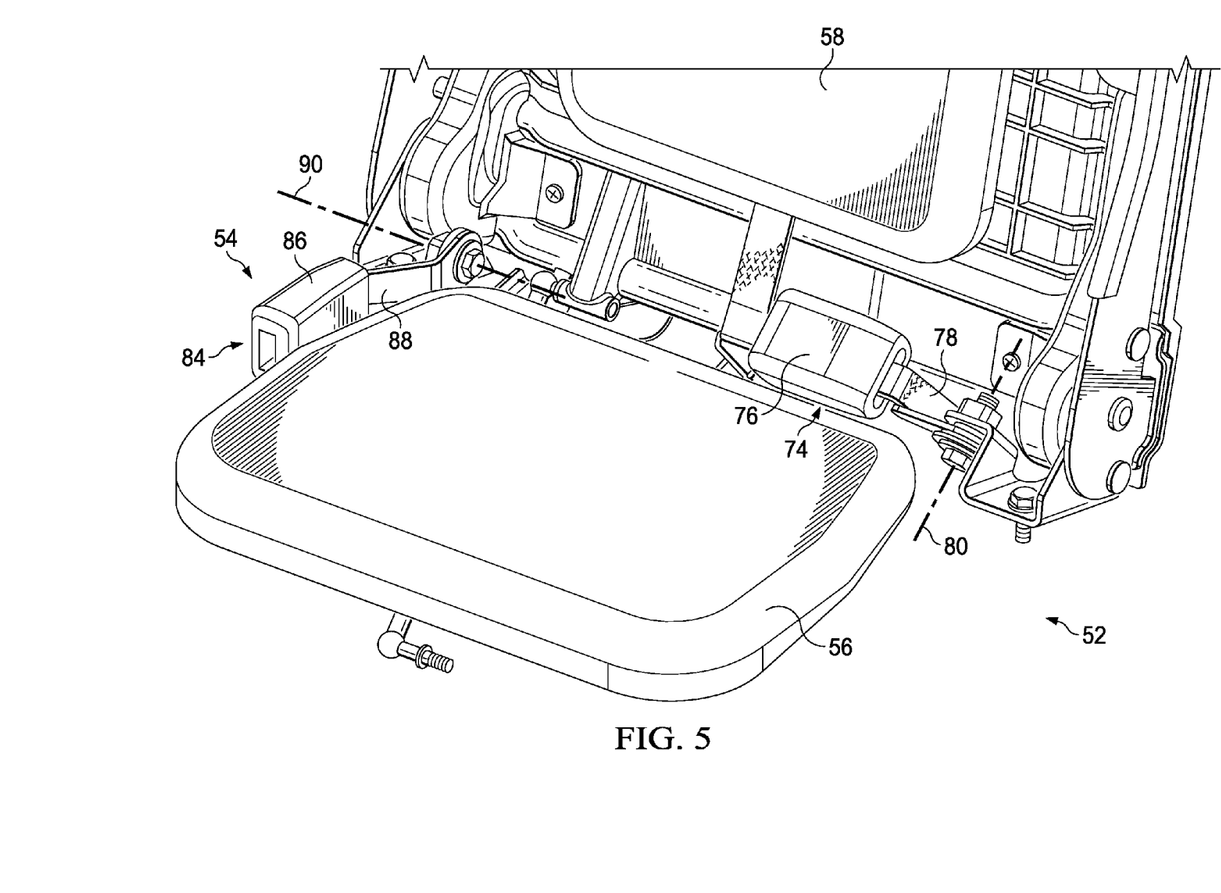
FIG. 5 is an enlarged perspective view depicting a portion of the vehicle of FIG. 1.

Also, with respect to the right rear seat 22, the associated rear seat belt assembly can include buckle assemblies 74, 84, as best shown in FIG. 5. The buckle assembly 74 is shown to include a buckle 76 and a strap 78 connected to the buckle 76. The strap 78 can be pivotally coupled with, and thus secured to, the frame 12 and/or the body 14, at a position proximate the inward side 52, such that the buckle 76 is pivotable about an axis 80. The buckle assembly 84 is shown to include a buckle 86 and a strap 88 connected to the buckle 86. The strap 88 can be pivotally coupled with, and thus secured to, the frame 12 and/or the body 14, at a position proximate the outward side 54, such that the buckle 86 is pivotable about an axis 90. The straps 78 and 88 can be formed from stamped metal, for example. In one embodiment, the axis 80 lies within a first plane that is perpendicular with a second plane in which the axis 90 lies, with the axes 80 and 90 being perpendicular with one another. In another embodiment, such axes might not be perpendicular with one another. In a configuration in which the utility bed 18 is configured for selective dumping, it will be appreciated that, in one embodiment, the straps 78 and 88 can be directly pivotally coupled with, and thus secured to, the bed frame 19 or another portion of the utility bed 18, and thus indirectly pivotally coupled with, and thus secured to, to the frame 12. Or, in another embodiment, buckle straps can be directly pivotally coupled with, and thus secured to, the frame 12.

Referring to FIG. 2, an anchor 66 can include a ring portion 68 that defines an anchor aperture 70, and a post 72 extending away from the ring portion 68 and connected to the upright portion 40 of the rear structure 34 of the roll cage 27, such as with a flange 74 welded to the upright portion 40. The flexible web member 64 can extend from the retractor assembly 62, through the guide aperture 73, and then through the anchor aperture 70 to connect the flexible web member 64 with the anchor 66.

Referring to FIGS. 2-4 and 6-7, the flexible web member 64 can also be connected to a proximal tongue 92 and a distal tongue 94. In one embodiment, the proximal tongue 92 can be slidably connected to the flexible web member 64. The buckle 76 of the buckle assembly 74 can be releasably engaged with the proximal tongue 92, and the buckle 86 of the buckle assembly 84 can be releasably engaged with the distal tongue 94, to at least partially restrain a person seated on the right rear seat 22 when in a use configuration, as shown in FIG. 4. More particularly, when the proximal tongue 92 is releasably engaged with the buckle 76 and the distal tongue 94 is releasably engaged with the buckle 86, a first portion 96 of the flexible web member 64 that extends from the anchor 66 to the proximal tongue 92 can define a shoulder belt, and a second portion 98 of the flexible web member 64 that extends from the proximal tongue 92 to the distal tongue 94 can define a lap belt, as also shown in FIG. 4. When the proximal tongue 92 is not engaged with the buckle 76 and the distal tongue 94 is not engaged with the buckle 86, the buckle assemblies 74 and 84 can be folded out of the way, as shown in FIG. 5, so as not to interfere with folding of the right rear seat 22 downward into the utility bed 18.

Figure 3:
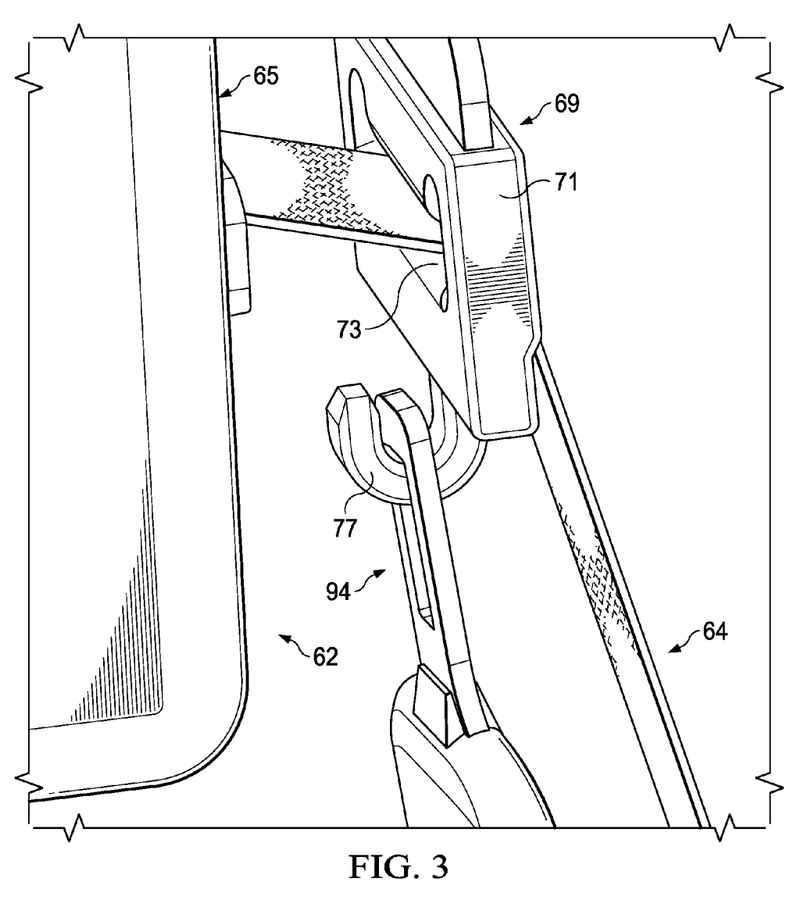
FIG. 3 is an enlarged perspective view depicting a portion of the arrangement of FIG. 2.

In one embodiment, the webbing guide 69 can include a retaining member such as a hook 77, as shown for example in FIG. 3. The hook 77 can extend downwardly from the guide member 71 and can support the distal tongue 94 when the utility bed 18 is in a storage configuration (with the right rear seat 22 downward into the utility bed 18) and the associated seat belt assembly in a stowed configuration. In this stowed configuration, as shown in FIG. 2, the components of the seat belt assembly, such as the flexible web member 64, can be quickly and conveniently stored, without resulting in noise and vibration during driving of the vehicle. It will be appreciated that a seat belt assembly can additionally be provided for the left rear seat 20 that is similar to the seat belt assembly described above with respect to the right rear seat 22, and can include, for example, a retractor assembly 63 and an anchor 67, as shown in FIG. 1.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A vehicle comprising:
a frame;
a body supported by the frame;
a roll cage supported by at least one of the frame and the body, the roll cage at least partially defining a rear protected area;
at least one rear seat, each of the at least one rear seat being positioned within the rear protected area; and
at least one rear seat belt assembly, each of the at least one rear seat belt assembly being associated with a respective one of the at least one rear seat; wherein
the roll cage comprises a rear structure, the rear structure comprising an upright portion supported by, and extending at least generally upwardly from, at least one of the frame and the body, the rear structure further comprising an upper portion extending at least generally forwardly from the upright portion;
each of the at least one rear seat belt assembly comprises:
a retractor assembly attached to the upper portion of the rear structure of the roll cage;
a flexible web member extending from the retractor assembly;
an anchor connected to the upright portion of the rear structure of the roll cage;
a plurality of tongues, the flexible web member being connected to the anchor and each of the tongues; and
a plurality of buckle assemblies, each of the buckle assemblies being adjacent one of the at least one rear seat; and
for each of the at least one rear seat belt assembly, each of the tongues is configured for releasable engagement with a respective one of the buckle assemblies, to at least partially restrain a person seated on a respective one of at the at least one rear seat, when the rear seat belt assembly is in a use configuration.

2. The vehicle of claim 1, wherein each one of the at least one rear seat comprises an inward side and an outward side, and wherein, for each of the at least one rear seat belt assembly:
the plurality of tongues comprises a proximal tongue and a distal tongue;
the plurality of buckle assemblies comprises a first buckle assembly and a second buckle assembly, the first buckle assembly being secured at a position proximate one of the inward side and the outward side of one of the at least one rear seat, the second buckle assembly being secured at a position proximate the other one of the inward side and the outward side of the one of the at least one rear seat; and
the proximal tongue is configured for releasable engagement with the first buckle assembly and the distal tongue is configured for releasable engagement with the second buckle assembly.

3. The vehicle of claim 1, wherein, for each of the at least one rear seat belt assembly:
the plurality of buckle assemblies comprises a first buckle assembly and a second buckle assembly;
the first buckle assembly is pivotable about a first axis; and
the second buckle assembly is pivotable about a second axis.

4. The vehicle of claim 3, wherein, for each of the at least one rear seat belt assembly:
the first axis lies within a first plane and the second axis lies within a second plane, the first plane being perpendicular to the second plane.

5. The vehicle of claim 2, wherein, for each of the at least one rear seat belt assembly:
the first buckle assembly comprises a first buckle and a first strap connected to the first buckle, the first buckle being configured for releasable engagement with the proximal tongue, the first strap being pivotally coupled with at least one of the frame and the body; and
the second buckle assembly comprises a second buckle and a second strap connected to the second buckle, the second buckle being configured for releasable engagement with the distal tongue, the second strap being pivotally coupled with at least one of the frame and the body.

6. The vehicle of claim 2, wherein, for each of the at least one rear seat belt assembly:
when the proximal tongue is releasably engaged with the first buckle assembly and the distal tongue is releasably engaged with the second buckle assembly, a first portion of the flexible web member that extends from the anchor to the proximal tongue defines a shoulder belt, and a second portion of the flexible web member that extends from the proximal tongue to the distal tongue defines a lap belt.

7. The vehicle of claim 1, wherein, for each of the at least one rear seat belt assembly:
the retractor assembly comprises a retractor attached to the upper portion of the rear structure of the roll cage, the retractor operably and selectively dispensing and retracting the flexible web member.

8. The vehicle of claim 7, wherein, for each of the at least one rear seat belt assembly:
the retractor assembly further comprises a webbing guide, the webbing guide being positioned proximate the retractor and connected to at least one of the retractor and the roll cage;
the webbing guide comprises a guide member that defines a guide aperture, the flexible web member extending through the guide aperture; and
the webbing guide further comprises a hook, the hook extending downwardly from the guide member and supporting one of the tongues when the at least one rear seat belt assembly is in a stowed configuration.

9. The vehicle of claim 8, wherein, for each of the at least one rear seat belt assembly:
the anchor comprises a ring portion defining an anchor aperture, and a post extending away from the ring portion and connected to the upright portion of the rear structure of the roll cage; and
the flexible web member extends through the anchor aperture.

10. The vehicle of claim 1, further comprising:
at least one front seat supported by at least one of the frame and the body;
the roll cage at least partially defines a front protected area, the at least one front seat being positioned within the front protected area;
a utility bed comprising a bed frame pivotally coupled with at least one of the frame and the body, the utility bed being configured for selective dumping and convertible to selectively provide the at least one rear seat;
each of the buckle assemblies is pivotally coupled with the bed frame;
the at least one rear seat comprises a left rear seat and a right rear seat; and
the at least one rear seat belt assembly comprises a left rear seat belt assembly associated with the left rear seat, and a right rear seat belt assembly associated with the right rear seat.

11. A vehicle comprising:
a frame;
a body supported by the frame;
a roll cage supported by at least one of the frame and the body, the roll cage comprising a rear structure and at least partially defining a rear protected area;
a utility bed supported by at least one of the frame and the body, the utility bed being convertible to selectively provide at least one rear seat, each of the at least one rear seat comprising an inward side and an outward side, each of the at least one rear seat being positioned within the rear protected area; and
at least one rear seat belt assembly, each of the at least one rear seat belt assembly being associated with a respective one of the at least one rear seat; wherein
each of the at least one rear seat belt assembly comprises:
a retractor assembly attached to the rear structure of the roll cage;
a flexible web member extending from the retractor assembly;
a proximal tongue and a distal tongue, the flexible web member being connected to each of the proximal tongue and the distal tongue; and
a first buckle assembly and a second buckle assembly; wherein
for each of the at least one rear seat belt assembly, the first buckle assembly is configured for releasable engagement with the proximal tongue and is pivotally coupled with at least one of the frame and the body at a position proximate one of the inward side and the outward side of one of the at least one rear seat, the second buckle assembly being pivotally coupled with at least one of the frame and the body at a position proximate the other one of the inward side and the outward side of the one of the at least one rear seat.

12. The vehicle of claim 11, wherein, for each of the at least one rear seat belt assembly:
the first buckle assembly is pivotable about a first axis and the second buckle assembly is pivotable about a second axis; and
the first axis lies within a first plane and the second axis lies within a second plane that is perpendicular to the first plane.

13. The vehicle of claim 12, wherein:
the first buckle assembly comprises a first buckle and a first strap connected to the first buckle, the first buckle being configured for releasable engagement with the proximal tongue, the first strap being pivotally coupled with at least one of the frame and the body; and
the second buckle assembly comprises a second buckle and a second strap connected to the second buckle, the second buckle being configured for releasable engagement with the distal tongue, the second strap being pivotally coupled with at least one of the frame and the body.

14. The vehicle of claim 12, wherein:
the rear structure of the roll cage comprises an upright portion supported by, and extending at least generally upwardly from, at least one of the frame and the body, the rear structure further comprising an upper portion extending at least generally forwardly from the upright portion; and
for each of the at least one rear seat belt assembly, the retractor assembly comprises a retractor attached to the upper portion of the rear structure of the roll cage, the retractor operably and selectively dispensing and retracting the flexible web member.

15. The vehicle of claim 14, wherein, for each of the at least one rear seat belt assembly:
the retractor assembly further comprises a webbing guide, the webbing guide being positioned proximate the retractor and connected to at least one of the retractor and the roll cage; and
the webbing guide comprises a guide member that defines a guide aperture, the flexible web member extending through the guide aperture.

16. The vehicle of claim 15, wherein, for each of the at least one rear seat belt assembly:
the webbing guide further comprises a retaining member, the retaining member extending downwardly from the guide member and supporting the distal tongue when the utility bed is in a storage configuration and the at least one rear seat belt assembly is in a stowed configuration.

17. The vehicle of claim 15, wherein, for each of the at least one rear seat belt assembly:

the at least one rear seat belt assembly further comprises an anchor connected to the upright portion of the rear structure of the roll cage, the anchor defining an anchor aperture; and the flexible web member extends through the anchor aperture.

18. The vehicle of claim 17, wherein, for each of the at least one rear seat belt assembly:

when the proximal tongue is releasably engaged with the first buckle assembly and the distal tongue is releasably engaged with the second buckle assembly, a first portion of the flexible web member that extends from the anchor to the proximal tongue defines a shoulder belt, and a second portion of the flexible web member that extends from the proximal tongue to the distal tongue defines a lap belt.

19. The vehicle of claim 11, wherein:

the proximal tongue is slidably connected to the flexible web member.

20. The vehicle of claim 11, further comprising:

at least one front seat supported by at least one of the frame and the body; wherein the roll cage at least partially defines a front protected area, the at least one front seat being positioned within the front protected area;

the at least one rear seat comprises a left rear seat and a right rear seat; and the at least one rear seat belt assembly comprises a left rear seat belt assembly associated with the left rear seat, and a right rear seat belt assembly associated with the right rear seat.

* * * * *